DEVICE IN ELECTRICAL CLOSETS

Filed July 11, 1966 11 Sheets-Sheet 1

Hans Josef Nordstedt and Lars Folke Delin INVENTORS
BY Wenderoth, Lind and Ponack, Attorneys Dec. 3, 1968 H. J. NORDSTEDT ET AL 3,413,659

DEVICE IN ELECTRICAL CLOSETS

Filed July 11, 1966 11 Sheets-Sheet 2

Hans Josef Nordstedt and INVENTORS
Lars Falke Deten
BY Wenderoth, Lind
and Ponack, attorneys Hans Josef Nordstedt and
Lars Folke Delin,
INVENTORS BY Wenderoth, Lind and
Ponack, attorneys Dec. 3, 1968 H. J. NORDSTEDT ET AL 3,413,659

DEVICE IN ELECTRICAL CLOSETS

Filed July 11, 1966 11 Sheets-Sheet 4

Hans Josef Nordstedt and Lars Folke Delin INVENTORS

BY Wenderoth, Lind and Ponack, Attorneys

DEVICE IN ELECTRICAL CLOSETS

Hans Josef Nordstedt and Lars Falke Delin INVENTORS

BY Wenderoth, Lind and Ponack, Attorneys

Hans Josef Nordstedt and
Lars Folke Delin INVENTORS

BY Wenderoth, Lind
and Ponack
Attorneys

INVENTORS:
Hans Josef Nordstedt and
Lars Folke Delin
BY Wenderoth, Lind
and Ponack, Attorneys Hans Josef Nordstedt and
Lars Folke Delin
INVENTORS
BY Wenderoth, Lind
and Ponack,
Attorneys Hans Josef Nordstedt and
Lars Folke Delin,
INVENTORS
BY Wenderoth, Lind
and Ponack
Attorneys Dec. 3, 1968 H. J. NORDSTEDT ETAL 3,413,659

DEVICE IN ELECTRICAL CLOSETS

Filed July 11, 1966 11 Sheets-Sheet 10

Hans Josef Nordstedt and
Lars Folke Delin,
INVENTORS

BY Wenderoth, Lind and Ponack,
attorneys

Hans Josef Nordstedt and
Lars Folke Delin
INVENTORS

BY Wenderoth, Lind
and Ponack
Attorneys

United States Patent Office 3,413,659
Patented Dec. 3, 1968

3,413,659
DEVICE IN ELECTRICAL CLOSETS

Hans Josef Nordstedt and Lars Folke Delin, Amal, Sweden, assignors to Aktiebolaget Hakanssons Industrier, Amal, Sweden, a corporation of Sweden
Filed July 11, 1966, Ser. No. 564,089
Claims priority, application Sweden, July 15, 1965, 9,339/65
21 Claims. (Cl. 4—131)

Figure 1:
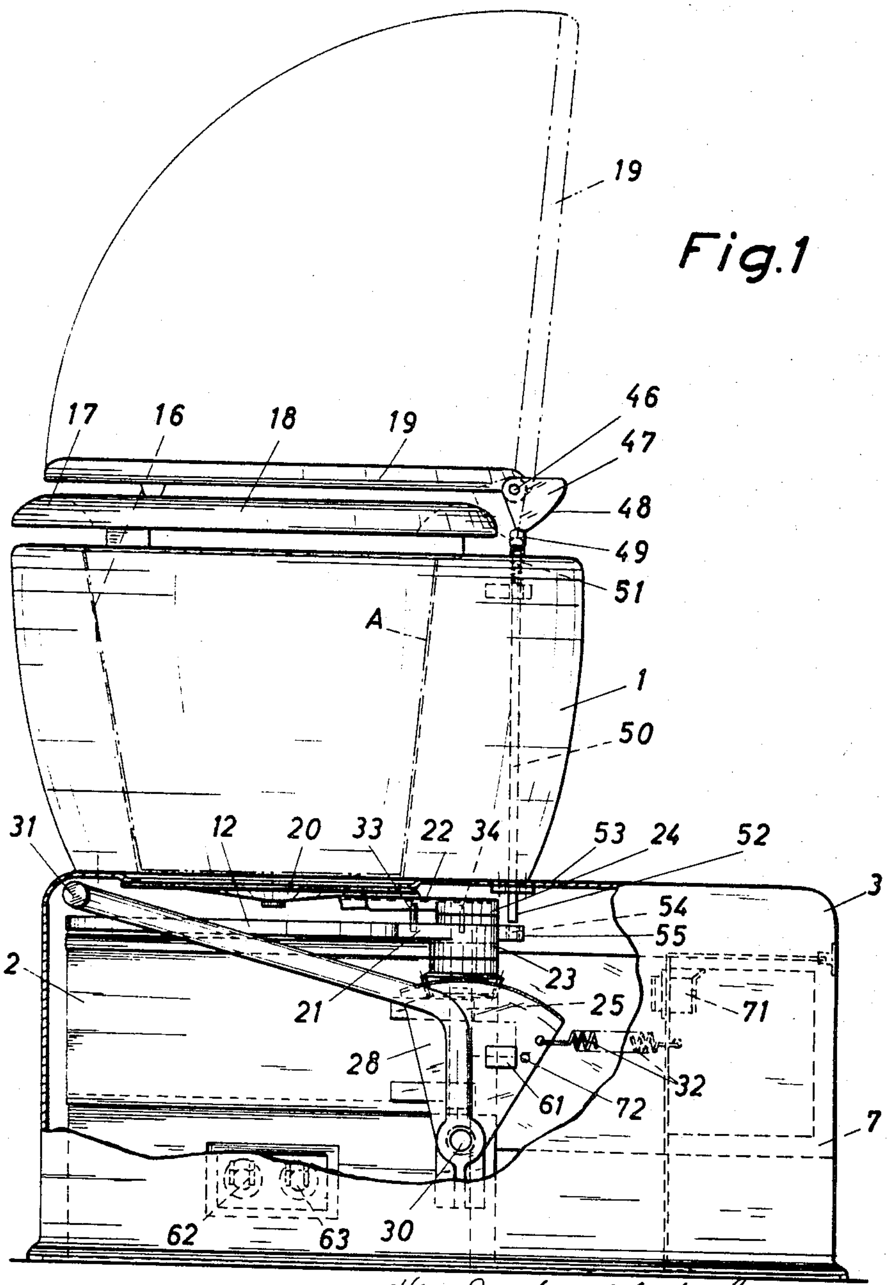

The present invention relates to electrical closets of the type consisting of two parts, one located on top of the other, the upper one consisting of a conically downwards tapering closet chair and the lower one of an electrical combustion chamber.

An electric closet must fulfill the requirements of emitting practically no odour and of eliminating the risk that a person using the closet be burnt by the heat created in the combustion chamber.

By means of the present invention these problems have been solved in a satisfactory way. The main feature of the invention is to be seen therein that the lower end of the closet chair is provided with a lower lid which can be swung away to one side and that the upper end of the combustion chamber is provided with an upper lid to be swung away in the same direction, preferably by means of a pedal, the upper lid being larger than the lower lid and adapted to perform a swinging movement until one of its edges reaches a position approximately below the corresponding edge of the lid before said lower lid is brought to participate in this opening movement. The lid at the lower end of the closet chair may (and should) be of a relatively small diameter considering the conically downwards tapering shape of the closet chair. The combustion chamber, on the other hand, which must be given rather considerable dimensions and provided with a heat insulation on the outside, consequently is formed at its upper end with an upper lid the diameter of which considerably exceeds the one of the lower lid. In order that it be possible for an impermeable cone-shaped bag, which is to be inserted in the closet chair before use, after use to fall down into the combustion chamber on a grid disposed in an ash box introduced into the combustion chamber, both the lower lid and the upper lid must be opened, however, it being necessary that these lids are constructed in such a way that the opening movement of them takes place in a manner permitting the bag to fall straight down into the combustion chamber without first touching the combustion chamber cover, which in such a case naturally could be defiled. According to the invention, these opening movements can be performed only through the combustion chamber cover being forced to start its opening movement before the lower closet chair lid is swung towards the side thereby allowing the bag to fall down into the combustion chamber.

According to an embodiment of the invention the lid covering the closet chair or the shaft for rotation of said lid is provided with locking means preventing any movement to open the door of the combustion chamber as long as the closet chair lid is open. The electric coupling of the electric closet chair includes a switch which is inserted in a secondary circuit to the main circuit which comprises the electric heating element in the combustion chamber. This control switch is arranged in such a way that it closes the secondary circuit—which in turn causes a connecting of the main circuit to the heating element of the combustion chamber—at the returning of the combustion chamber cover to its closing position. For the reason that the combustion chamber cover according to the invention cannot be swung to the side as long as the upper lid of the closet chair is in its swung up position, there is no risk for a person sitting on the closet chair to be burnt by the heat of the combustion chamber for the reason that the combustion chamber cover and the lower closet chair lid in this position of the upper closet chair lid cannot be swung to the side, i.e. be opened.

As the electric coupling is arranged in such a way that the period of combustion starts when the combustion chamber cover has been swung back to its closed position, a prerequisite for this procedure is that said cover must first have been swung to the side. In order that the combustion be initiated it is thus required that the upper closet chair lid be first put down. The closet is hereby made safe therein that there is little risk that a person using the closet will burn himself and therein that the risk of fire is generally diminished.

The present invention represents a further development of this inventive idea. The electrical closet in accordance with the invention consequently includes a locking means arranged to render impossible the opening up of the upper closet chair lid while the combustion chamber cover is in its laterally displaced position and the combustion chamber in consequence thereof is open. This arrangement further diminishes the risk of fire. If namely the combustion chamber cover has been swung away to the side and for any reason, e.g. if the mechanism for returning the combustion chamber cover is out of function, and the incineration in the combustion chamber has been initiated, it is then no longer possible to open the upper closet chair lid.

In such electric closet it should as indicated in the aforegoing before the use of the same be inserted in an inset bag of paper or another suitable material, this bag adapted to receive the faeces. However, if the person using the electric closet forgets to arrange, before the use, an inset bag in the closet bowl or if somebody happens to empty a bucket of slops in the electric closet, there is a risk that these slops or urine, respectively, could leak to the outside of the closet bowl and thereby cause an unpleasant smell. In case a great quantity of liquid is emptied in the closet bowl, there is further the risk that the mantle arranged about the combustion chamber could lead electric current due to electric flash over.

According to one embodiment of the invention the aforementioned drawbacks are eliminated by means of arranging a vessel about the opening of the combustion chamber, said vessel adapted to catch liquid overflowing the combustion chamber. The collecting vessel has a bottom the plane of which with advantage inclines somewhat down to the combustion chamber. A heat insulation sealing material is arranged between the vessel and its attachment points to the combustion chamber. This sealing material comprises e.g. glass fibres, asbestos or the like.

Said collection vessel also fulfills the function to protect, at an overflow, the details adherent to the combustion chamber (fan motor, fan wheel, etc.) against corrosion. It simultaneously serves as a heat shield for protection against the heat radiation emitted from the combustion chamber.

According to a further embodiment of the invention there is between the closet chair and the combustion chamber arranged a connection tube the inner diameter of which, at least at the lower end, is greater than the diameter of the lower opening (outlet opening) of the closet chair and the diameter of the lower lid or the like closing this opening and the cover or the like closing the inlet to the combustion chamber are adapted to be opened simultaneously and to be closed by means of a common operation means.

The device makes it possible to arrange the combustion chamber in the basement level of a house or just under an existing floor surface whilst the closet chair can be arranged above this floor surface or in an upper story. Further, it is also possible to shape the combustion chamber considerably greater than in case the closet chair as arranged in a hitherto common way directly upon the combustion chamber. Such a greater combustion chamber could also be used for garbage incineration. It is then also rendered possible to choose a location suitable in the room in question and this location does not necessarily have to be vertically below the closet chair. It is then possible to connect the connection tube to the lower end at one side of the combustion chamber. The cover or the lid for the closing of the combustion chamber may then be arranged in the connection tube proper. The device is suitable to be used especially in trains driven by means of electric power. The occurring of an unpleasant smell in the premise where the closet is placed may be completely avoided.

The closet construction further comprises a number of thermostatically controlled switches arranged in such a way that at the exceeding of a certain value of the temperature at the gas outlet and also at other places the current circuit is automatically cut off and a fan driven by means of an electric motor and adapted to be brought to operation also after that the current to the heating element of the combustion chamber has been cut off until the temperature of the exhaust gas has dropped under a certain predetermined value.

Figure 6:
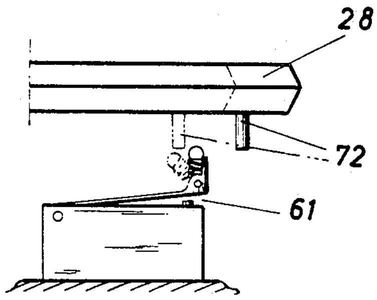
Figure 2:
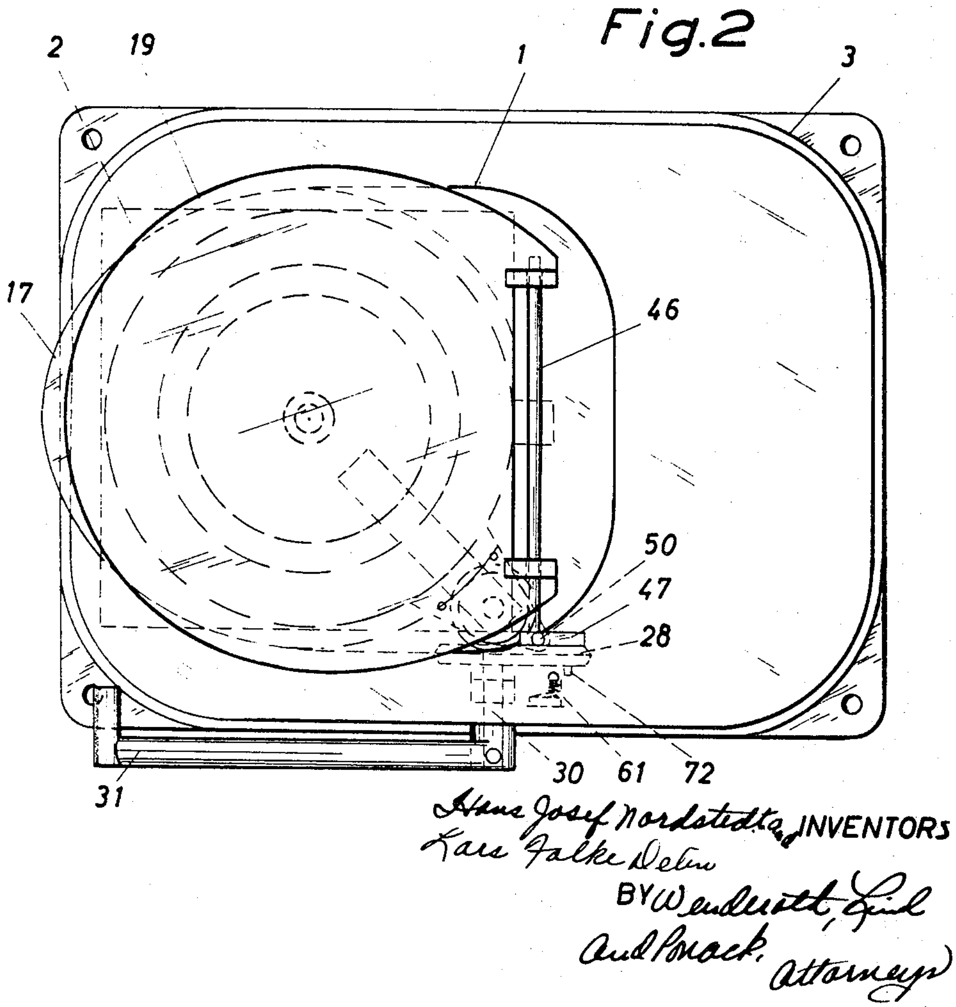
Figure 3:
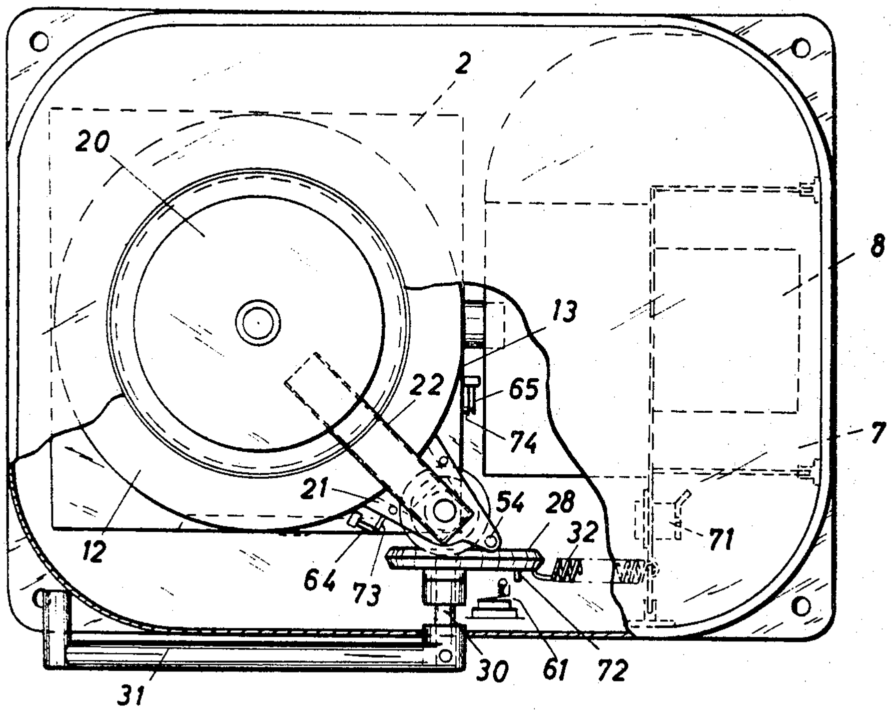
Figure 11:
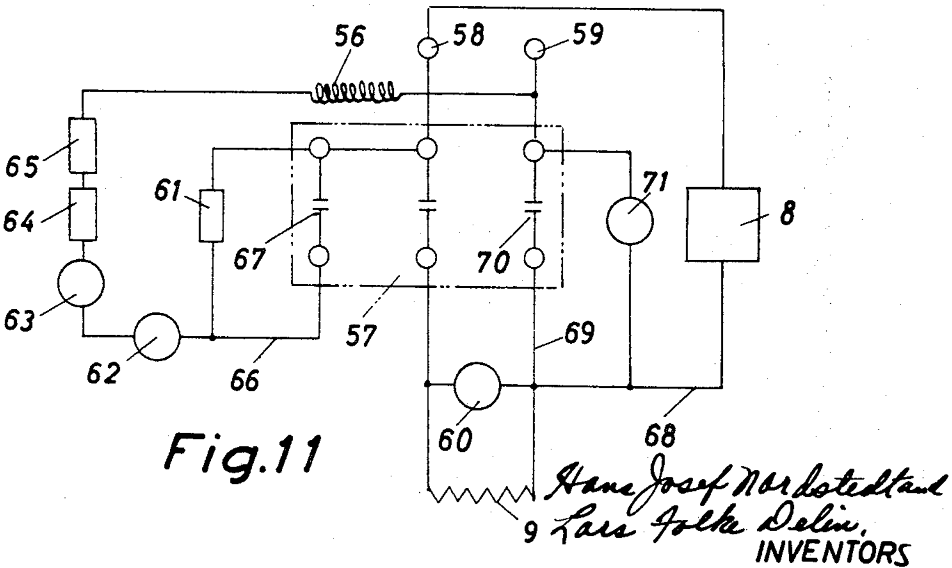
Figure 4:
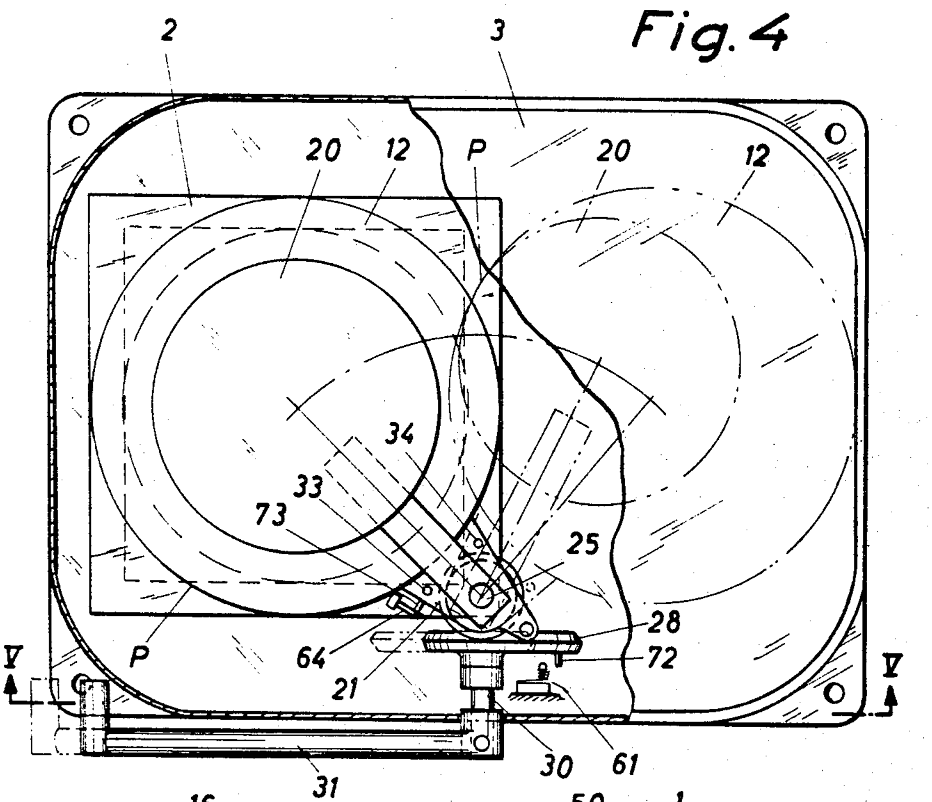
Figure 5:
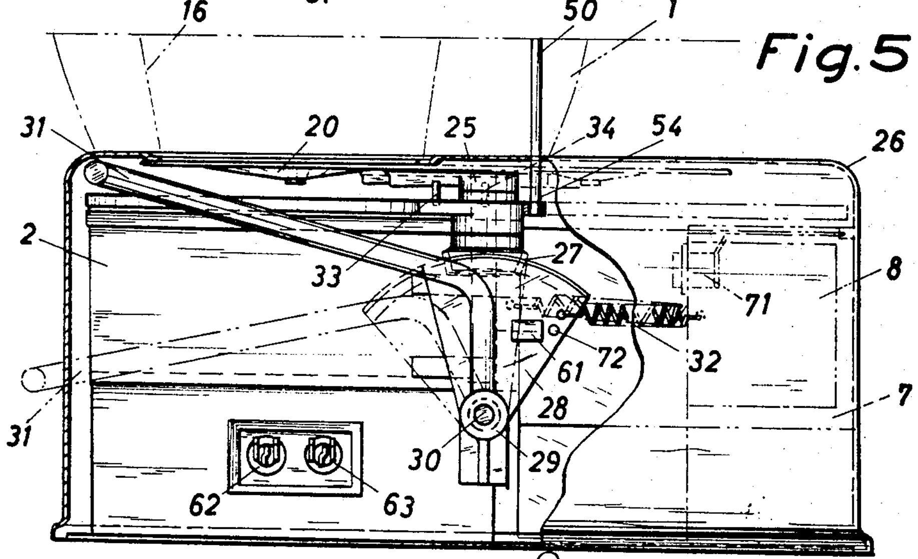
Figure 7:
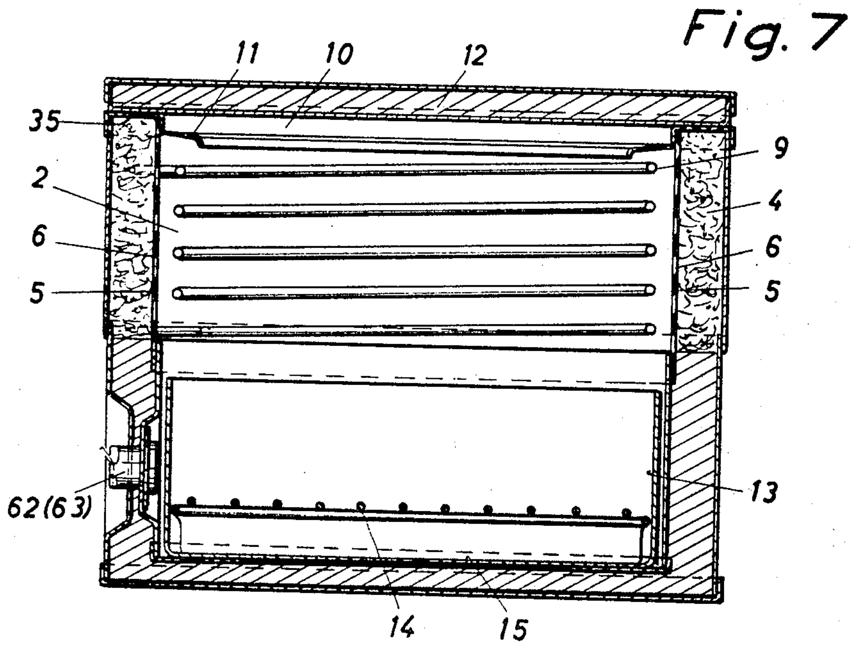
Figure 8:
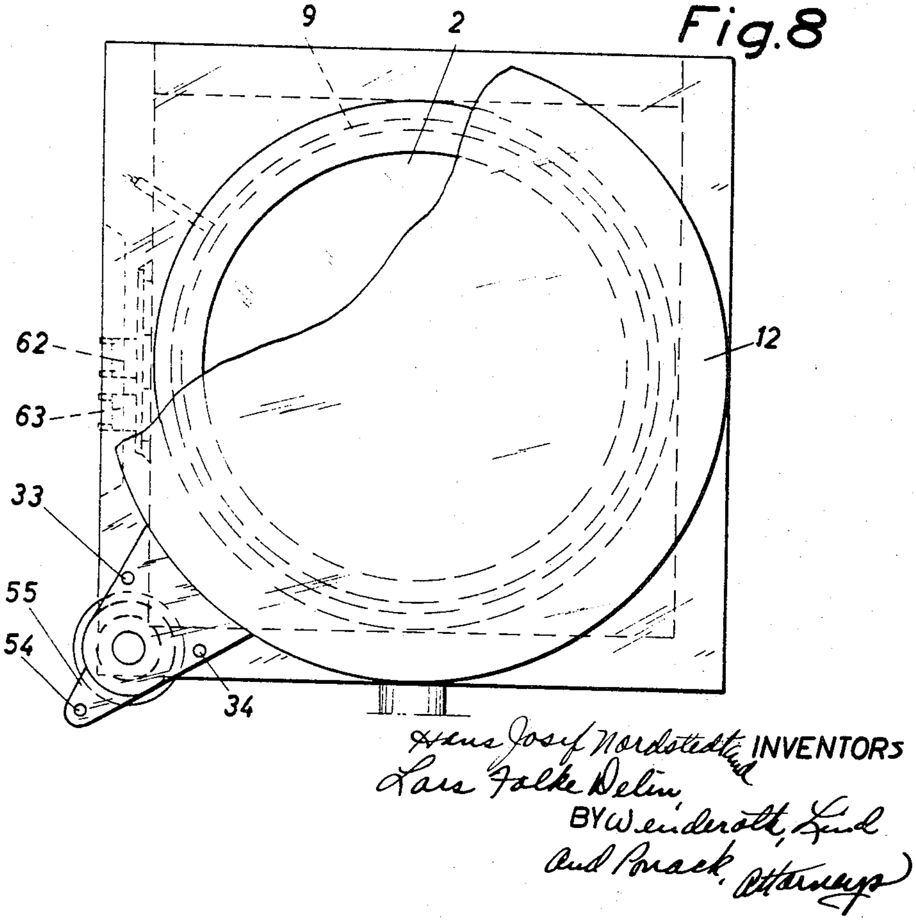
Figure 10:
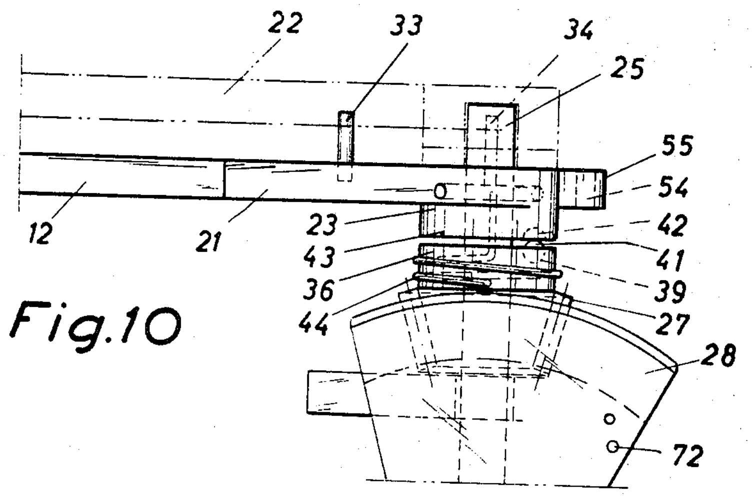
Figure 9:
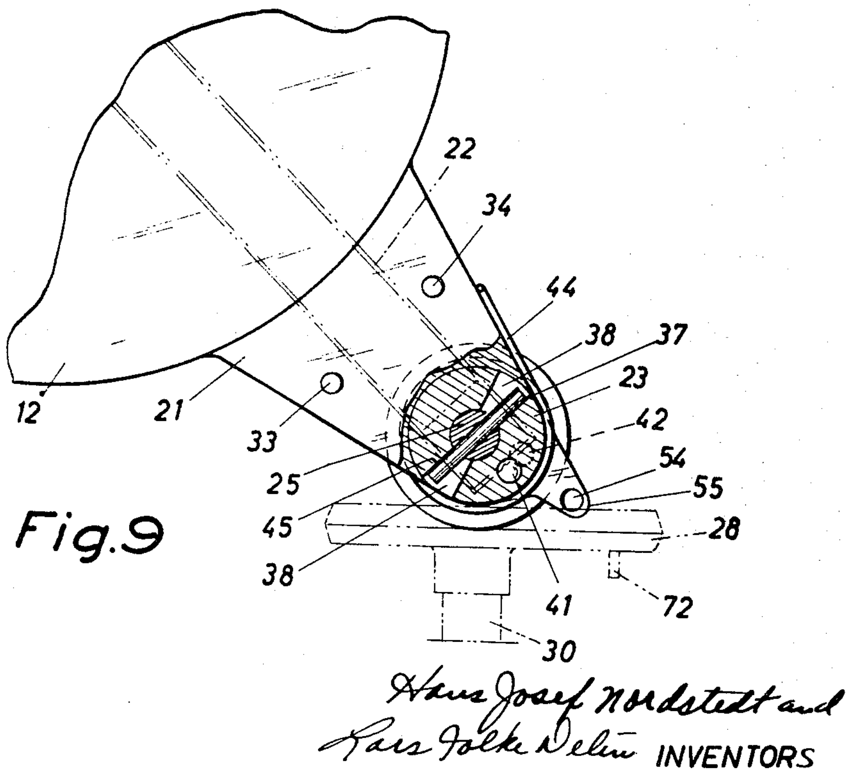
Figure 12:
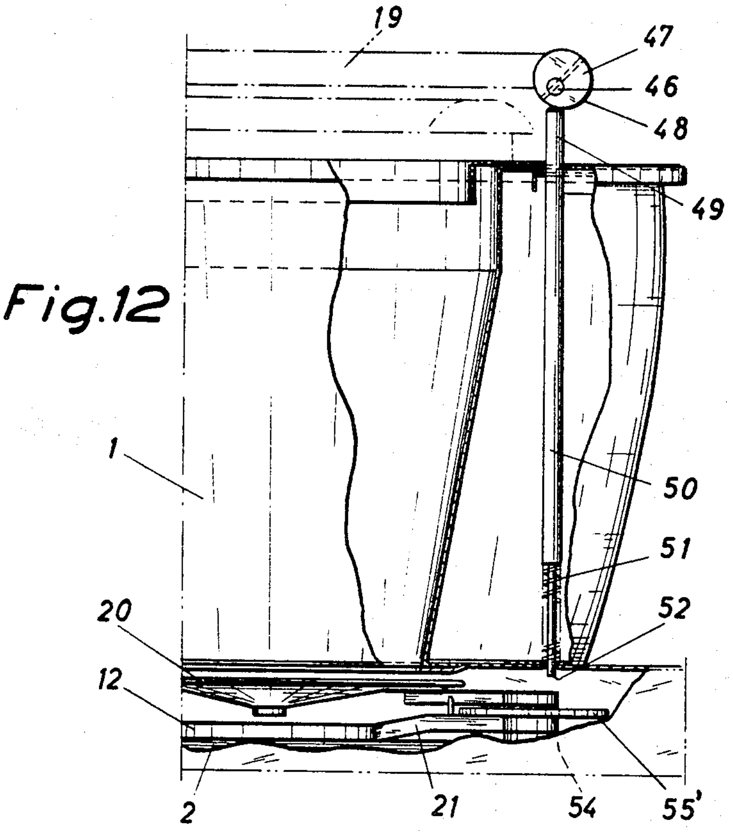
Figure 13:
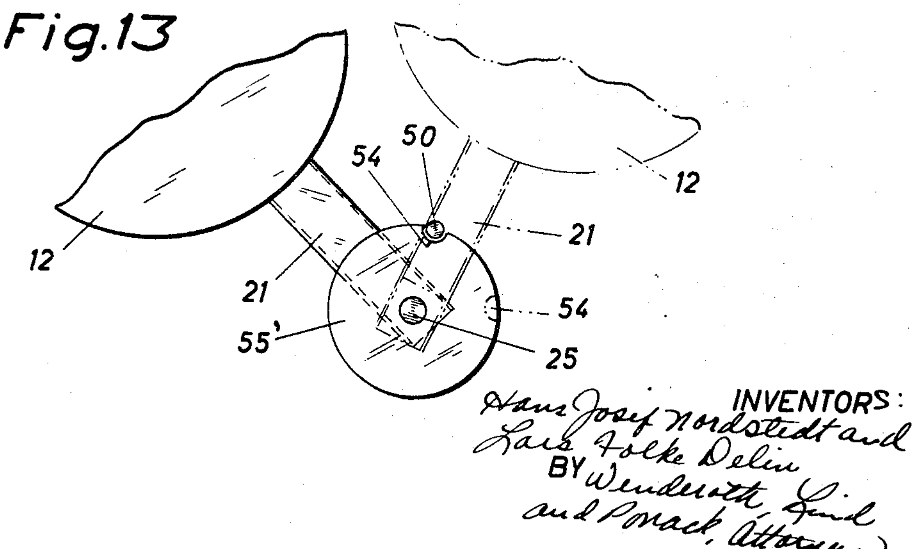
Figure 14:
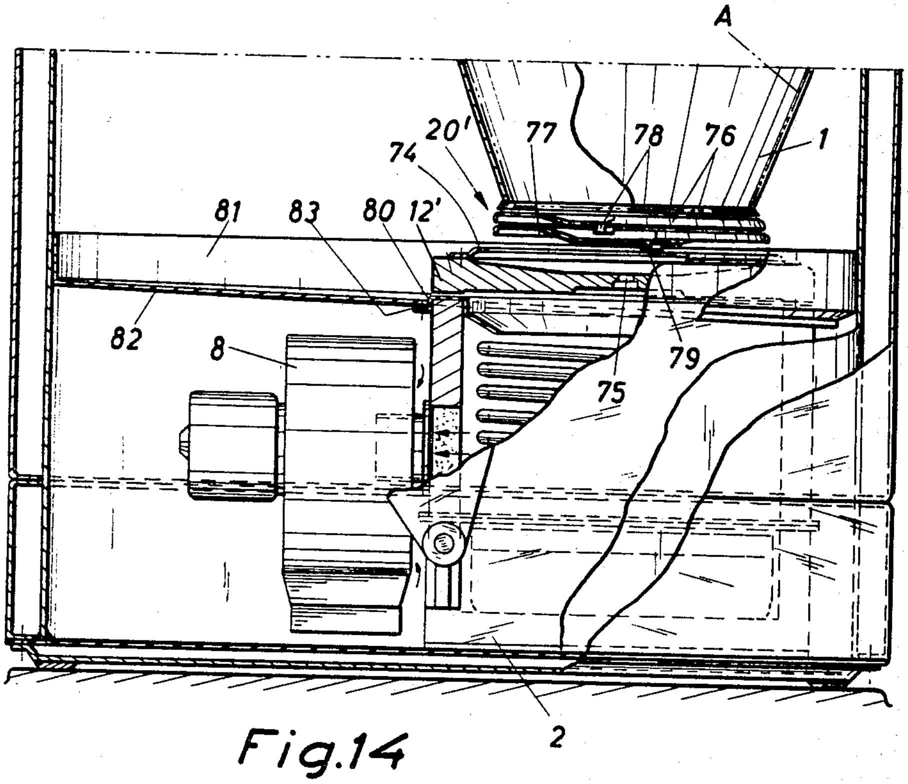
Figure 15:
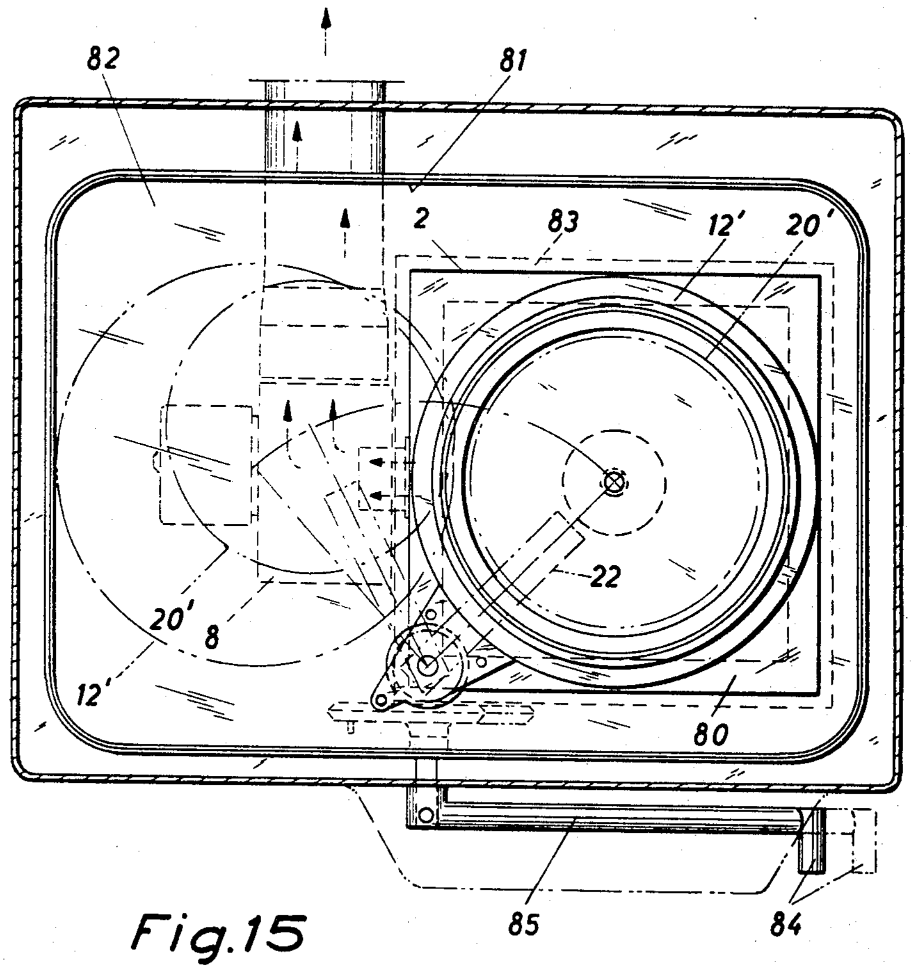
Figure 16:
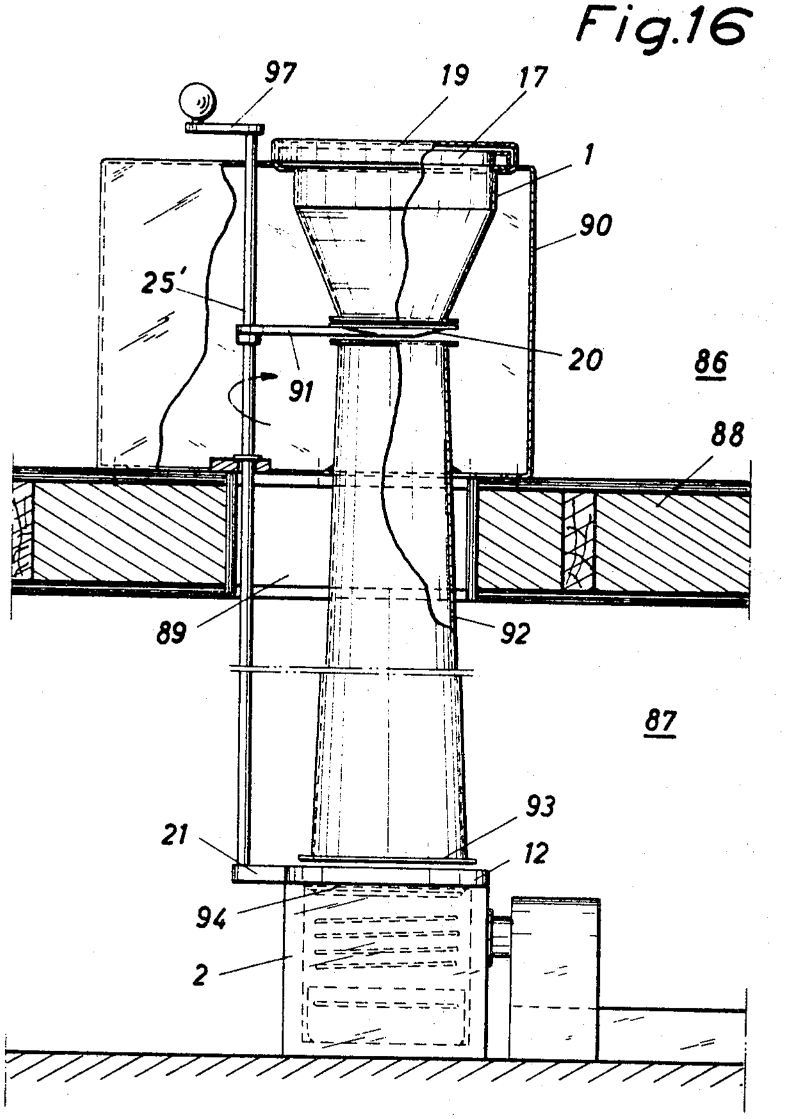
Figure 17:
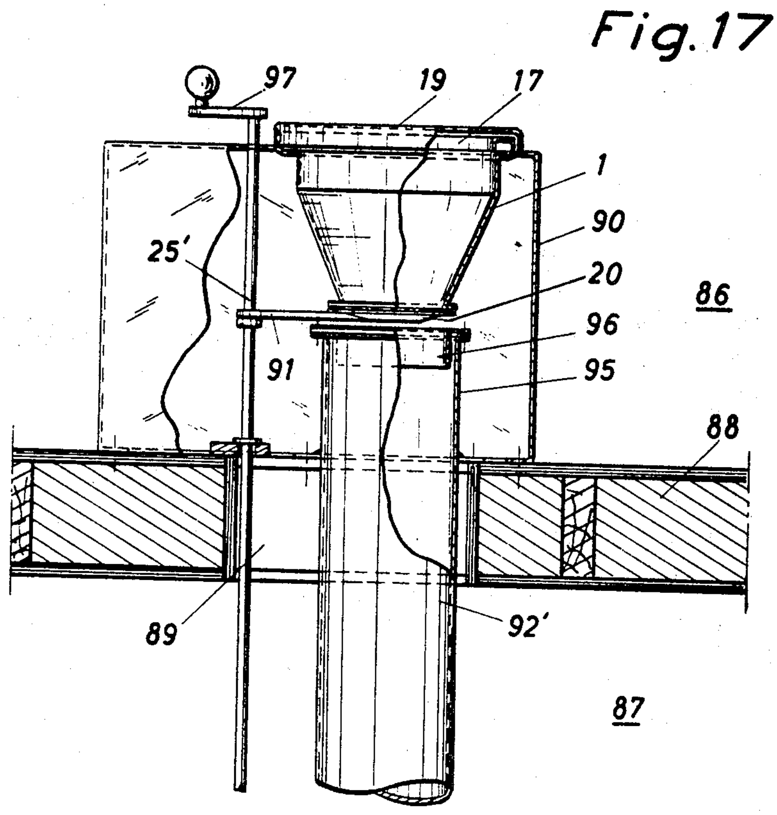
Figure 18:
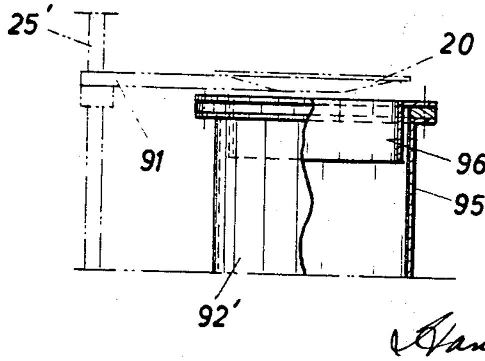

In the following the invention will be described more in detail with reference had to the accompanying, partly diagrammatical drawings. In the drawings:

FIG. 1 is a side elevation shown partly in a vertical longitudinal section of an electric closet according to the invention, FIG. 2 is a corresponding plan view, FIG. 3 is a plan view, shown in a partial horizontal section, of the lower portion of the electric closet with the combustion chamber, FIG. 4 is a partly sectioned plan view of the lower part of the closet illustrating the combustion chamber cover in closed and open positions, FIG. 5 shows a vertical section through said lower portion on the line V—V in FIG. 4, FIG. 6 shows on an enlarged scale a plan view of the switch shown at the lower portion of the closet in FIG. 3, FIG. 7 shows also on an enlarged scale a vertical section through the combustion chamber with its ash box, FIG. 8 is a partly sectioned plan view of the combustion chamber, FIG. 9 is a plan view shown in a horizontal section through the device for swinging the combustion chamber cover in a horizontal plane, FIG. 10 is a front view of this device, FIG. 11 shows the electric coupling diagram of the device, FIG. 12 is a side elevation shown partly in longitudinal section of the rear portion of the closet chair and the upper portion of the combustion chamber, FIG. 13 is a plan view of the combustion chamber cover and the shaft of this cover, FIG. 14 is a partly sectioned side elevation of a combustion chamber provided with a collection vessel according to the invention, FIG. 15 is a plan view of the combustion chamber with the vessel according to the invention, FIG. 16 shows a vertical section through an electric closet with a conical connection tube between the closet chair and the combustion chamber, FIG. 17 shows a similar section through the upper portion of the unit with a cylindrical connection tube, and FIG. 18 shows on an enlarged scale the upper end of the connection tube according to FIG. 17.

The upper portion 1 of the electric closet, which portion comprises a closet chair, is situated centrally above the combustion chamber 2 in the lower portion 3 of the electric closet. The combustion chamber 2 is insulated on all sides and its side walls are provided with a catalyst element 4 in the shape of a filter which comprises $Al_2O_3$. The inner wall 5 of the combustion chamber 2 is provided with perforations 6 through which gases can be sucked out from the combustion chamber by means of a fan 8 driven by an electric motor and arranged in the gas outlet 7. The gas outlet 7 is adapted to be connected to a chimney (not shown). In the combustion chamber 2 there is along the inside of the walls 5 arranged an electrical tube element 9 and a protection sheet 11 is arranged above this element 9 in the vicinity of the upper opening 10 of the combustion chamber 2. The opening 10 has a circular cross section and is adapted to be closed by means of a circular cover 12. In the lower portion of the combustion chamber 2 there could be inserted an ash box 13 provided with a grid 14 situated at a certain distance above the bottom 15 of the ash box 13.

The closet chair 3 is arranged vertically above the combustion chamber 2, and the chair 1 is provided with a conically downwards tapering inserted portion 16, a seat 17 above the insertion portion 16 and an upper lid 19 covering the central opening 18 of the seat 17. The lower opening of the inserted portion can be closed by means of a lower circular lid 20 adapted to be swung to the side.

The combustion chamber cover 12 and the lower lid 20 are each provided with a rearwards directed arm 21 and 22, respectively, and these arms 21, 22 are with each their hub 23 and 24, respectively, journalled for being freely turnable on the upper end of the drive shaft 25. On the lower end of the drive shaft 25, this shaft being journalled in the wall of the combustion chamber 2, carries a conical sprocket 27 which cooperates with and is driven by a racketed segment 28 shaped in a corresponding way, this segment 28 being carried with its hub 29 on one end of a shaft 30 journalled in a mantle 26 enclosing the combustion chamber and the fan 8. The opposite (outer) end of the shaft 30 carries a pedal 31. By means of a helical spring 32 the racketed segment 28 is kept in its right (according to FIG. 5) oscillation position with the pedal 31 in lifted position (shown with unbroken lines in FIG. 5). The arm 21 on the combustion chamber cover 12 is provided with two upwardly extending driving pins 33, 34 which grip on either side of the lower lid arm 22 in such a way that the cover 12 can be swung sidewards in relation to the lower lid 20 before this lower lid 20 by the pins 33, 34 is brought to follow the cover 12 when the latter is moved in lateral direction. The pin 33 is arranged in such a way in relation to the lower lid arm 22 that the peripheral border of the cover 12 at the point P is situated under the corresponding point on the lower lid 20 before the latter is brought along in the opening up movement.

So as to render it possible for the cover 12 to close tightly against the annular upper border 35 (FIG. 7) of the opening 10 of the combustion chamber 2 the closet also includes a device which permits the cover 12 at the end of the closing movement to sink down to and rest on the border 35 but it is on the other hand forced to be lifted from this border before the opening up movement in lateral direction is started.

There is in FIGS. 9 and 10 shown a device which renders this possible. The shaft 25 is provided with a ring flange or a shoulder which in the shown embodiment comprises the hub 36 of the sprocket 27. The hub 23 is journalled on the cover arm 21 above the sprocket hub 36. The rotation movement is restricted by means of a pin 37 which in transverse direction is forced into the shaft 25 and with the ends engages two sector-shaped notches 38 in the arm hub 23. There is in a notch 39 in the end surface 40 of the hub 36 inserted a steel ball 41 which when the cover 12 is in closed position engages a corresponding notch 42 in the end surface 43 of the hub 23. In this position the cover 12 rests on the ring border 35. A helical spring 44 which with one end is attached to the hub 23 and with the opposite end is attached to the hub 36 tends to swing the cover 12 to closing position a distance which corresponds to the idle movement of the pin 37 in the notches 38.

When the pedal 31 is pushed down by means of the foot, the racketed segment 28 is swung in counter-clockwise direction according to FIG. 5 and turns the sprocket 27 and thus also the shaft 25 whereas the pin 37 to begin with runs idle in the notches 38 while compressing the spring 44. The ball 41 follows the sprocket 27 and its hub 36 in the movement of the shaft 25 and then it slides out of the notch 42 in the cover arm hub 23. The latter is then lifted together with the cover 12 a distance corresponding to the depth of the notch 42, i.e. some few millimeters, such that the cover will be situated in a position free from the combustion chamber. When at the continued rotation of the shaft 25 the driving pin 37 abuts against one border 45 of the sector-shaped notches 38, the arm 21 and the cover 12 are caused to swing in clockwise direction according to FIG. 9. As soon as the pin 33 abuts against the lower lid arm 22, the border of the cover 12 will be situated at the point P below the corresponding border of the lower lid 20, this lower lid 20 is brought to participate in the opening movement. In FIG. 4 there is shown with dash and dot line the cover 12 and the lower lid 20 swung to the side such that a bag (A, FIG. 1) inserted in the inset portion 16, a person sitting on the chair having released himself in this bag, will fall straight down into the combustion chamber 2 and be caught by the grid 14. Here, a complete incineration takes place and the gases are, by means of the fan 8, sucked out to the chimney.

However, so as to prevent a person using the closet to be burnt it is according to the invention arranged in such a way that a swinging away of the cover 12 and the lower lid 20 and the connection of the heating element 9 in the combustion chamber 2 cannot be carried out until the upper closet chair lid 19 is swung down and thus no person can sit on the seat 17. This problem has according to the invention been solved in such a way that the lower lid 20 or its shaft 46 of rotation is provided with a sector-shaped cam 47 the peripheral border 48 of which abuts against the upper end 49 of a vertical press rod 50 which by means of a helical spring 51 is displaced in a direction up against the cam 47. The rod 50 is with its lower end 52 which extends through the upper portion 53 of the mantle 3, insertable into an aperture 54 on a rearwardly directed elongation portion 55 on the lid arm 21. When the upper lid 19 has been swung up (shown in dash and dot lines in FIG. 1), the cam 47 is swung in clockwise direction whereas the helically upwards extending border 48 on the cam displaces the rod 50 against the action of the spring 51 with the end 52 down into the aperture 54 and locks thereby the combustion chamber cover 12 in closed position. Thus, the cover 12 cannot be opened by a pressing down of the pedal 31. However, when the upper closet chair lid 19 is swung down (shown in unbroken lines in FIG. 1), the cam 47 is swung in counter-clockwise direction and then the rod 50 will be lifted by the spring 51 to a position in which the rod end 52 is brought out of engagement with the elongation portion 55. Thus, the combustion chamber cover 12 cannot now be opened up by means of the pedal 31.

The closet according to the invention further comprises a contactor 57 (FIG. 11) which is provided with a holding coil 56 and which is connected to two phases 58, 59 (or phase and earth) of an electric net and at its connection it connects the heating element 9 in the combustion chamber 2 to these phases. A control lamp 60 is coupled in parallel to the element 9. In the secondary circuit in which the holding coil 56 is connected and which is connected to the phases 58, 59 there are in series with an operation contact 61 coupled two thermostat contacts 62 and 63 as well as two switches 64 and 65. By means of a connection 66 the secondary circuit is connected also to the contactor 57 behind a contact 67 in the same. The electric motor for driving the fan 8 is with one of its poles connected to the phase 58 and with its other pole connected through an electric conduit 68 connected to one of the electric conduits 69 to the element 9 behind the contact 70 which cuts off the current from the phase 59. A thermostat contact 71 which responds to an increasing temperature in the gas exhaust is connected between the conduit 68 and the phase 59 in front of the switch 70 and thus holds the circuit to the fan motor in operation as long as the temperature of the exhaust gases is higher than a certain predetermined value also when the contactor 57 is disconnected.

The operation switch 61 (see FIGS. 4, 6, and 11) is normally broken but is closed periodically by an operation pin 72 on the racketed segment 28 when the latter after a pushing down of the pedal 31 by means of the foot and after a releasing again of this pedal, is swung in clockwise direction according to FIG. 1 back to its initial position. It is left uninfluenced at the swinging in opposite direction of the racketed segment. The switch 64 (FIGS. 4 and 11) is normally kept in closed position by a laterally directed operation pin 73 on the cover arm 21 but cuts off when the cover 12 is opened (is swung in clockwise direction according to FIG. 4). The switch 65 (FIGS. 3 and 11) is closed by an operation pin 74 on the ash box 13 when the latter is inserted completely into the combustion chamber 2. The two thermostat switches 62, 63 (FIGS. 5 and 11) coupled in series are normally closed but one of them cuts off at a certain predetermined temperature, e.g. 400–500° C., in the combustion chamber 2, and the other one at a certain defined still higher temperature in the combustion chamber 2, e.g. at 600–700° C. in case the first mentioned thermostat for any reason should not have cut off the circuit. The switches 62, 63 are arranged at the lower portion of the unit in or near the combustion chamber.

When the cover 12 at the pushing down of the pedal 31 by means of the foot is swung to the side, the secondary circuit is cut off. The cover 12 is returned by a swinging caused by the spring 32 and when the cover 12 takes the closing position, the switch 64 is closed by the operation pin 73. At the return of the racketed segment 28 to the initial position, the operation switch 61 is momentarily closed by the operation pin 74 and thereby the holding coil is fed with current by means of the connection of the secondary circuit to the electric net. The contactor 57 is then connected and couples the element 9 to the electric net. The circuit enclosing the holding coil 56 is kept in closed position via the switch 67 when the operation switch 61 has cut off the circuit and when the racketed segment 28 has returned completely to its initial position. When the temperature of the exhaust gases exceeds a certain value e.g. 80° C. the thermostatically controlled switch 71 is energized and the motor of the fan 8 starts. When the bag with its contents has been completely incinerated on the grid 14—during this operation a good air circulation is obtained—the current is cut off from the element 9. The thermostatically operated switch 71 keeps the fan motor in operation until the temperature of the exhaust gases has dropped under the predetermined value.

The ash box 13 has to be emptied every now and then. The ash is completely sterile and free of germs.

In the embodiment shown in FIGS. 12 and 13 the upper lid 19 or its shaft of rotation 46 is provided with an eccentric cam disk 47 and the upper end 49 of the vertical push rod 50 abuts against the peripheral border of said cam disk 47 by means of the action of a helical spring 51. The rod 50 is by means of its lower end 52 insertable in a notch 54 at the periphery of a disk shaped portion 55' on the carrying arm 21 of the combustion chamber cover 12 in the vicinity of its carrying shaft 25.

When the combustion chamber cover 12 is in closed position (shown in unbroken lines in FIG. 13) the notch 54 will be situated exactly below the rod end 52. If for this reason in this position of the combustion chamber cover 12 the upper closet chair lid 19 is unfolded, the rod 50 is displaced by means of the cam disk 47 against the action of the spring 51 with its lower end 52 down into the notch 54. The upper lid 19, thus, may without any obstacle be opened and the closet be used. So as to initiate the incineration in the interior of the combustion chamber 2, the combustion chamber cover 12 must according to the chosen electric coupling first be swung away to the side and permit the contents of the closet chair 1 to fall down into the combustion chamber and the combustion chamber cover 12 be reclosed. These swinging movements of the cover 12 are, however, possible only when the rod 50 by the spring has been lifted with its lower end 52 out of the notch 54 which in turn requires that the upper closet chair lid 19 is in its folded down position.

If the combustion chamber cover 12 for any reason should remain in an open position, e.g. the position shown in FIG. 13 with dash and dot lines, it is not possible to reopen the upper lid 19 for the reason that the disk 55′ is then situated in the movement path of the lower end 52 of the rod 50. Thus, it is hereby obtained an extra safety device having as a result a diminished risk for fire.

In the aforegoing, the rod 50 has been described when coacting with a disk 55′ on the arm 21 for the combustion chamber cover 12 but for the reason that the combustion chamber cover and the lid 20 at the lower opening of the closet chair 1 to a certain degree are interconnected it could also be possible to arrange the disk 55′ on the carrying arm of the lower lid 20, said arm being rotatable about the shaft 25.

In the embodiment shown in FIGS. 14 and 15 the combustion chamber cover 12′ and also the lower closet chair lid 20 have been given a somewhat modified shape in comparison with the one shown in FIGS. 1 and 4. According to FIG. 14 the combustion chamber cover 12′ is bowl-shaped to a certain degree and has an erected collar flange 74 extending along the lid border. This flange is intended to prevent liquid entering the closet chair 1 from overflowing the border of the combustion chamber cover in such a case when by mistake a bag A has not been inserted into the closet chair 1. Further, there is in the combustion chamber cover 12′ arranged also a minor central opening 75 for feeding this liquid to the combustion chamber 2. The lower closet chair lid 20′ comprises two portions 76, 77 which are slightly bowl-shaped and which both are carried by means of the arm 22 (FIG. 15). The lid portions 76 and 77 have at the lower point each a passage opening 78 and 79, respectively, which openings are situated on either side of an imaginary vertical line through the passage opening 75 of the combustion chamber cover 12′. Any direct heat rays from the combustion chamber 2 could thereby impossibly reach up into the closet chair 1 when the cover 12′ and the lower lid 20′ are closed.

A flange 80 is arranged about the combustion chamber 2. To this flange 80 there is attached a collecting vessel 81 which is shaped as a flat rather shallow bowl which extends around the combustion chamber 2 and on one side of this chamber 2 it is extended over the fan 8. The bottom 82 of the vessel 81 inclines somewhat inwardly against the combustion chamber 2. The vessel 81 is preferably at suitable intervals around the combustion chamber 2 attached to the flange 80 preferably by means of bolts. There is between the bottom 82 of the vessel and the flange 80 arranged a seal 83 which on one hand forms a tightening and on the other hand serves for insulating the vessel 81 from the combustion chamber 2 in which the temperature at the incineration may reach the value of up to 500° C. Preferably, the seal 83 is manufactured from glass fibres or asbestos.

A pedal 84 is via a rocking arm 85 coupled to a rocking mechanism 86 for opening up the cover 12′ of the combustion chamber 2.

Assumed that a bucket with slops is emptied in the electric closet, the openings 78, 79 and 75 in the lower lid 20′ and the cover 12′ are insufficient for permitting the liquid successively to flow down into the combustion chamber 2. Instead, the liquid will stream out into the collecting vessel 81. For the reason that the bottom 82 of the vessel 81 inclines somewhat towards the combustion chamber 2, the liquid will drop down into the combustion chamber 2 and there be evaporated. That rest of the liquid which may remain about the combustion chamber 2 will quickly evaporate and be sucked out by means of the fan 8.

Thus, the collecting vessel serves on one hand as a protection sheet for the electric components thus eliminating any risk that there could occur any electric flashover between these components and also preventing any soiling of the outside of the combustion chamber 2, such a soiling resulting in an unpleasant smell.

The closet chair 1 could be lifted away thereby giving a possibility for cleaning of the collection vessel 81 which with advantage is manufactured from stainless steel so as to be apt to withstand corrosion attacks.

In FIGS. 1–18 reference letter 86 denotes a lavatory chamber e.g. in a villa, and reference letter 87 denotes a cellar premise below the lavatory chamber. In a framework 88 separating these two premises there is an opening 89 which is covered by a box 90 or the like. In this box 90 there is suspended a closet chair 1 with a seat 17 and a foldable upper lid 19. Below the lower opening of the closet chair 1 there is arranged a lower lid 20 to be swung in to a position closing the opening. The lower lid 20 is attached to a vertical arm 91 extending from a rod 51′ carried for rotation. Below the closet chair 1 there is arranged a connection tube 92 which according to FIG. 16 widens conically downwards and which with the lower end 93 is situated above the inlet 94 to the combustion chamber 2. The inlet 94 can be closed by means of the cover 12 which with the arm 21 is attached to the lower end of the rod 25′. The lower lid 20 and the cover 12 could be swung in lateral direction by means of a crank 97 in level with the upper lid 19 of the closet chair 1.

Before the use of the closet, a bag (not shown in FIG. 16) is arranged in the closet chair so as to catch the faeces. By a swinging to the side of the lower lid 20 and the cover 12 by means of the crank 97, the bag will fall down into the combustion chamber 2 without soiling in any way either the closet chair 1 or the connection tube 92. Upon a returning of the lid 20 and the cover 12 which is carried out automatically, e.g. by means of spring action, the incineration is automatically initiated.

In FIG. 17 the conical connection tube 19 has been replaced by a cylindric connection tube 92′. The inner diameter of this cylindric tube 92′ is considerably greater than the diameter of the outlet opening of the closet chair 1. In the upper end 95 of the connection tube 92′ there is centrally arranged a guiding flange 96 which ensures that the bag falling down from the closet chair 1 will pass down through the connection tube out of contact with its wall. It is hereby ensured that the connection tube 92, 92′ is not soiled.

The invention has been described in the aforegoing for purposes of illustration only and is not intended to be limited by this description or otherwise except as defined in the appended claims. Thus, the incineration could be carried out by means of a current of high frequency.

What we claim is:

1. In an electric closet, two compartments, one of said compartments arranged on the top of the other compartment, the upper one of these compartments comprising a closet chair tapering conically downwards and the other compartment comprising an electric combustion chamber, the lower end of said closet chair provided with a lid adapted to be swung to the side and the upper end of said combustion chamber provided with a cover adapted to be swung away to the side in the same direction as said lid, said cover being greater in diameter than said lid and adapted to perform a coordinated swinging movement until one of its borders is situated approximately under the corresponding border of said lid before said lid is brought to participate in said swinging movement.

2. In an electric closet as claimed in claim 1, said cover adapted to be swung away by means of a pedal.

3. In an electric closet as claimed in claim 1, said combustion chamber cover adapted, at the beginning of its opening up movement, first to be lifted up from the upper border of said combustion chamber.

4. In an electric closet as claimed in claim 1, said cover adapted to be swung away by means of a pedal and said combustion chamber cover adapted, at the beginning of its opening up movement, first to be lifted up from the upper border of said combustion chamber.

5. In an electric closet as claimed in claim 1, said combustion chamber cover and said lid with each their arm journalled on one and the same shaft, the arm of said cover provided with driving means with a certain idling, to bring along the arm of said lid in the movement of said cover, said lid arm carried for free rotation on said shaft.

6. In an electric closet as claimed in claim 1, said combustion chamber cover and said lid with each their arm journalled on one and the same shaft, the arm of said cover provided with pins, abutments or similar driving means so as, with a certain idling, to bring along the arm of said lid in the movement of said cover, said lid arm carried for free rotation on said shaft, said driving means extending through said shaft engaging a notch in a hub on said cover arm in such a way that said shaft can perform a certain part of a rotation before said cover arm is brought along by said pin in said rotation, there being between said hub and said abutment below said hub inserted a spherical body engaging on one hand a notch in said abutment, said spherical body being retained in said hub, and on the other hand in a more shallow notch in said hub, said hub being attached to said abutment by means of a helical spring.

7. In an electric closet as claimed in claim 1, a locking means adapted to render impossible an opening movement of said combustion chamber cover as long as a lid covering the closet chair is in a folded up position.

8. In an electric closet as claimed in claim 1, a locking means adapted to render impossible an opening movement of said combustion chamber cover as long as a lid covering the closet chair is in a folded up position, the upper closet chair lid provided with a cam disk adapted, at the folding up of said lid, to displace, against the action of a spring, a locking rod with its lower end down into an opening in the arm of said combustion chamber cover and thereby to retain said cover in its closing position.

9. An electric closet as claimed in claim 1, a locking means adapted to render impossible an opening up of said combustion chamber cover as long as said lid, covering said closet chair, is in folded up position, a locking means adapted to render impossible a folding up of said upper closet chair lid as long as said combustion chamber cover is swung away in lateral direction and said combustion chamber thus is open.

10. An electric closet as claimed in claim 1, a locking means having a displaceable locking rod adapted to render impossible an opening movement of said combustion chamber cover as long as a lid covering the closet chair is in a folded up position, and a locking means adapted to render impossible an opening up of said combustion chamber cover as long as said lid, covering said closet chair, is in folded up position, a locking means adapted to render impossible a folding up of said upper closet chair lid as long as said combustion chamber cover is swung away in lateral direction and said combustion chamber thus is open, said combustion chamber cover arm in the vicinity of its carrying shaft provided with a disk arranged in the movement path of the lower end of said displaceable locking rod and provided with a notch, said notch situated in front of the lower end of said rod when said combustion chamber cover is in locked position.

11. An electric closet as claimed in claim 1, a locking means having a displaceable locking rod adapted to render impossible an opening movement of said combustion chamber cover as long as a lid covering the closet chair is in a folded up position, and a locking means adapted to render impossible an opening up of said combustion chamber cover as long as said lid, covering said closet chair, is in folded up position, a locking means adapted to render impossible a folding up of said upper closet chair lid as long as said combustion chamber cover is swung away in lateral direction and said combustion chamber thus is open, said lower closet chair lid arm in the vicinity of its carrying shaft provided with a disk arranged in the movement path of the lower end of said displaceable locking rod and provided with a notch, said notch situated in front of the lower end of said rod when said combustion chamber cover is in locked position.

12. An electric closet as claimed in claim 1, a liquid collecting vessel being arranged about the inlet opening of said combustion chamber, said vessel adapted to collect liquid over-flowing said combustion chamber.

13. An electric closet as claimed in claim 1, a liquid collecting vessel being arranged about the inlet opening of said combustion chamber, said vessel adapted to collect liquid over-flowing said combustion chamber, the bottom of said collecting vessel inclining somewhat in the direction towards said combustion chamber.

14. An electric closet as claimed in claim 1, a liquid collecting vessel being arranged about the inlet opening of said combustion chamber, said vessel adapted to collect liquid over-flowing said combustion chamber, said collecting vessel attached to a flange arranged about the inlet opening of said combustion chamber.

15. An electric closet as claimed in claim 1, a liquid collecting vessel being arranged about the inlet opening of said combustion chamber, said vessel adapted to collect liquid over-flowing said combustion chamber, said collecting vessel attached to a flange arranged about the inlet opening of said combustion chamber, a seal arranged between said collecting vessel and said flange, said seal comprising a heat insulating material.

16. An electric closet as claimed in claim 1, a connection tube arranged between said closet chair and said combustion chamber, the inner diameter of said connection tube being at least at the lower opening of said tube greater than the diameter of the lower opening of said closet chair, the lid closing said opening and said cover closing the inlet to said combustion chamber arranged to be opened and closed approximately simultaneously by a common operation means.

17. An electric closet as claimed in claim 1, a connection tube arranged between said closet chair and said combustion chamber, the inner diameter of said connection tube being at least at the lower opening of said tube greater than the diameter of the lower opening of said closet chair, the lid closing said opening and said cover closing the inlet to said combustion chamber arranged to be opened and closed approximately simultaneously by a common operation means, the outlet opening of said closet chair situated centrally in relation to the upper end of said connection tube.

18. An electric closet as claimed in claim 1 a connection tube arranged between said closet chair and said combustion chamber, the inner diameter of said connection tube being at least at the lower opening of said tube greater than the diameter of the lower opening of said closet chair, the lid closing said opening and said cover closing the inlet to said combustion chamber arranged to be opened and closed approximately simultaneously by a common operation means, said connection tube widening conically downwards.

19. An electric closet as claimed in claim 1, a connection tube arranged between said closet chair and said combustion chamber, the inner diameter of said connection tube being at least at the lower opening of said tube greater than the diameter of the lower opening of said closet chair, the lid closing said opening and said cover closing the inlet to said combustion chamber arranged to be opened and closed approximately simultaneously by a common operation means, the outlet opening of said closet chair situated centrally in relation to the upper end of said connection tube, said connection tube widening conically downwards.

20. An electric closet as claimed in claim 1, said closet chair being arranged in one room above from the premise where said combustion chamber is arranged.

21. An electric closet as claimed in claim 1, a connection tube arranged between said closet chair and said combustion chamber, the inner diameter of said connection tube being at least at the lower opening of said tube greater than the diameter of the lower opening of said closet chair, the lid closing said opening and said cover closing the inlet to said combustion chamber arranged to be opened and closed approximately simultaneously by a common operation means, said closet chair being arranged in one room above from the premise where said combustion chamber is arranged.

References Cited

UNITED STATES PATENTS

| | | | |
|---|---|---|---|
| 122,123 | 12/1871 | Loewenstein | 4—132 |
| 456,236 | 7/1891 | Kraetsch | 110—9 |
| 749,769 | 1/1904 | Wilson | 110—9 |
| 1,081,130 | 12/1913 | Miller | 4—132 |
| 2,768,386 | 10/1956 | Graef | 110—9 |
| 3,098,144 | 7/1963 | Dale | 4—131 |
| 3,331,338 | 7/1967 | Blankenship | 4—131 |

FOREIGN PATENTS

| | | |
|---|---|---|
| 710,208 | 8/1931 | France. |

LAVERNE D. GEIGER, *Primary Examiner.*

H. K. ARTIS, *Assistant Examiner.*